April 25, 1961 V. L. KIPPING 2,981,146
CURVED SCREEN MOTION PICTURE FILM GATE
Filed July 22, 1957 3 Sheets-Sheet 1

INVENTOR.
VERNON L. KIPPING
BY
Townsend and Townsend
ATTORNEYS

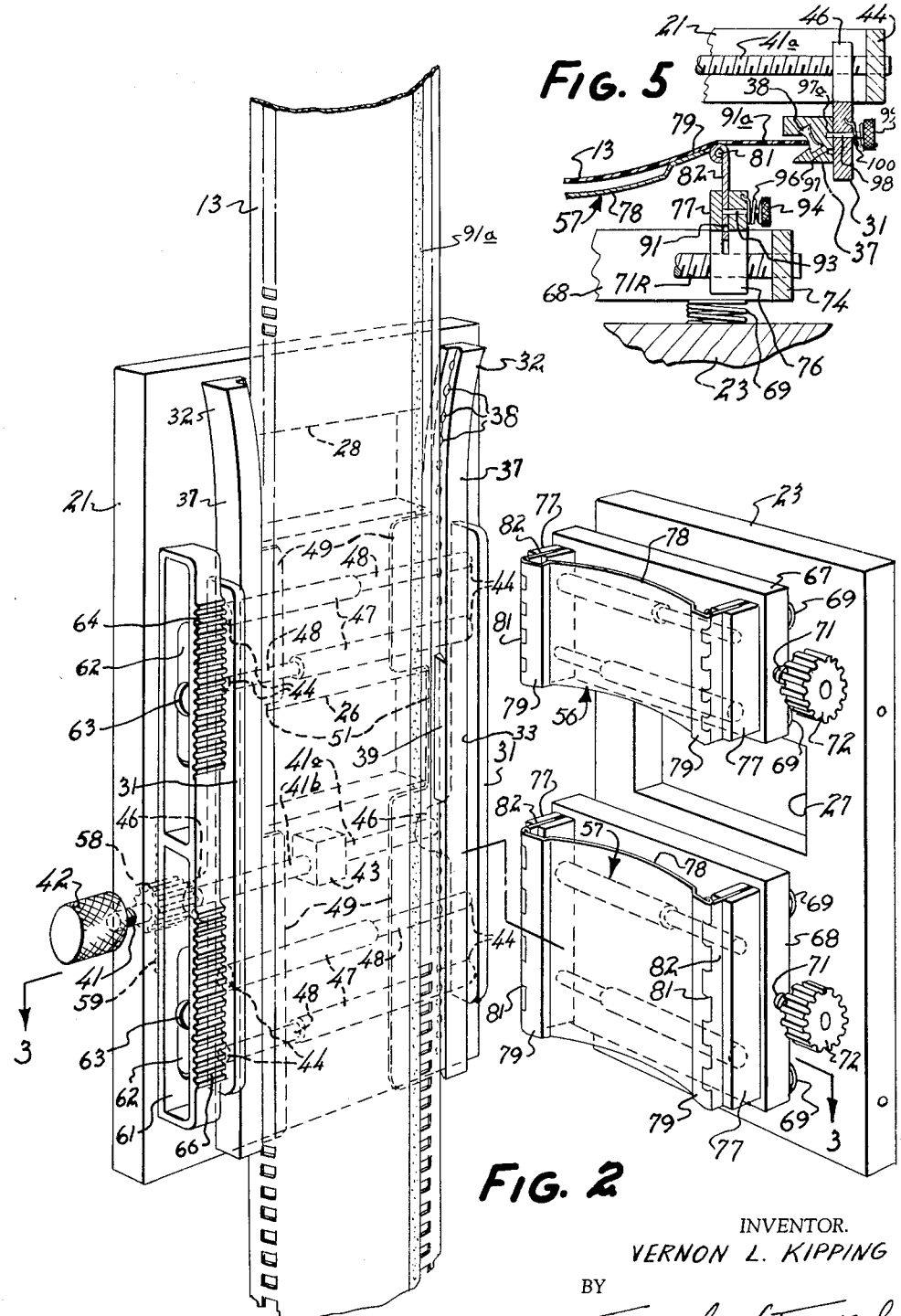

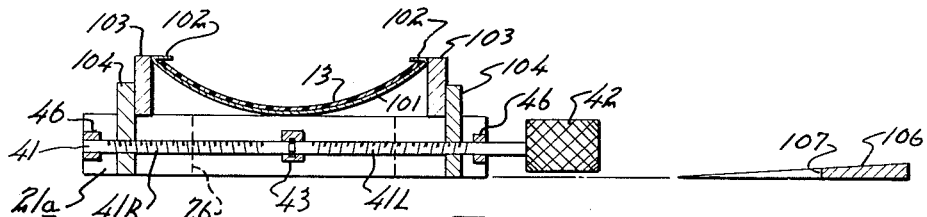
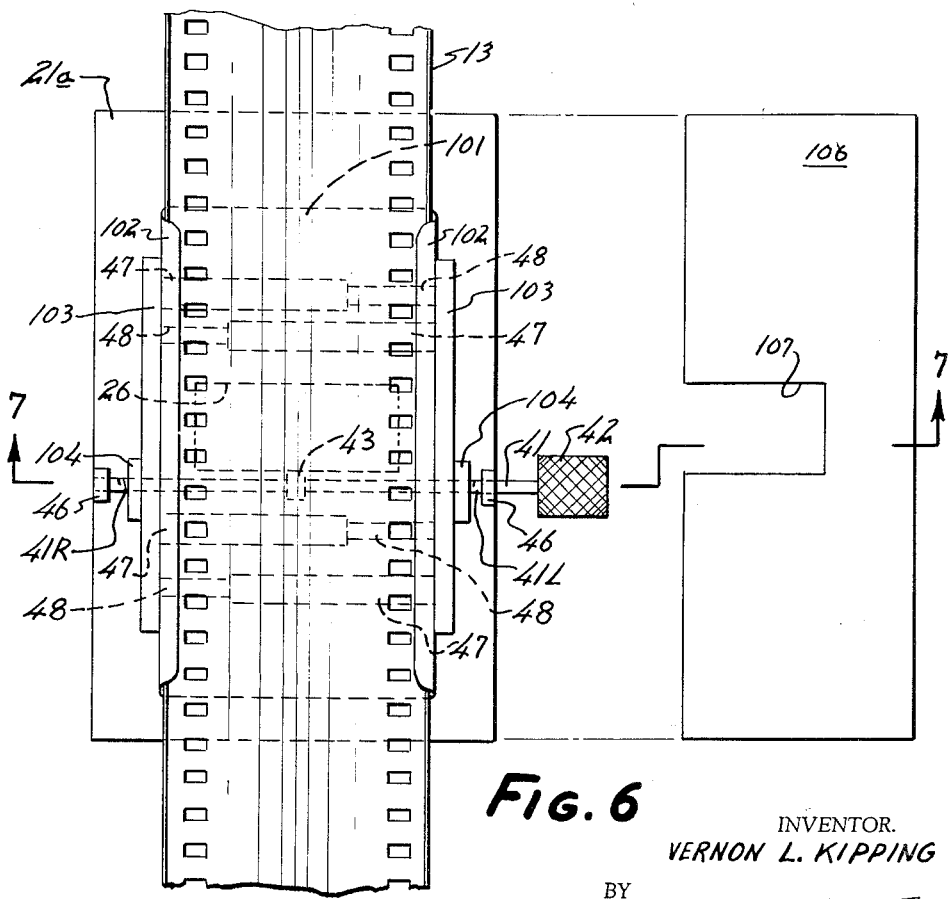

United States Patent Office 2,981,146
Patented Apr. 25, 1961

2,981,146

CURVED SCREEN MOTION PICTURE FILM GATE

Vernon L. Kipping, 540 Melrose Ave.,
San Francisco 12, Calif.

Filed July 22, 1957, Ser. No. 673,229

3 Claims. (Cl. 88—17)

This invention relates to a new and improved motion picture projector and camera for use with a curved projecting screen and is characterized by the fact that the film, as it passes behind the lens, is curved at the same curvature as the screen. The curvature of the film is accomplished by pressure against the edges of the film.

A principal purpose of this invention is to remedy the problem of varying focus and lack of overall sharpness on curved screens used in motion picture theatres at the present time.

Many of the current film mediums utilize a wide curved screen for the projection of motion pictures in theatres. One reason for the curved screen is to compensate for the distortion introduced by the wide angle lens used in photographing the film. Another reason is that the deep, curved screen surface creates an additional dramatic effect by giving the viewers a greater sense of audience participation. However, while the dramatic effect of the motion picture is enhanced, the curved screen does create a problem in that it is difficult to keep the motion picture in focus over the entire screen surface. This occurs because the screen surface, being curved, is at varying distances from the projector.

It is very important to have the greatest possible screen brilliance. Thus large aperture projection lenses are used to project the greatest intensity of light possible on the screen. However, as wide aperture projection lenses have a very shallow depth of focus, it is difficult to focus the projection lens so that overall screen sharpness results.

As a result, the projectionist in focusing the lens on the central of the screen, finds his efforts have caused the far edges of the screen picture to go out of focus. Or if the sides of the picture are brought into sharp focus, then the center of the screen will become fuzzy.

This problem of varying screen sharpness is a source of irritation to the movie-goer, and it therefore detracts from the value of the motion picture as entertainment.

One method of securing over-all screen sharpness is to increase the depth of field by using a slower or smaller aperture projection lens. This, however, will result in a reduction of screen brilliance which is not desirable.

The purpose of the present invention is to provide overall screen sharpness without subsequent loss of screen brilliance. This is accomplished by the use of a corrective device at the projection window area in the motion picture projector.

This corrective device imparts an arc to the motion picture film by applying pressure against the edges of the film. The degree of arc imparted to the film can be varied by controlling the amount of pressure exerted against the edges of the motion picture film as it passes by the film gate for projection. The arc imparted to the film is concentric with and will generally correspond to the arc described by the curved screen.

In focusing a projector to project an image upon a distant surface, the projection lens is moved close to the surface of the film being projected. Where the projector is to be focused upon a surface near the projector, the lens is moved away from the film in the projector. Thus it may be seen that if a projector lens is to project a consistently sharp image upon a surface which by being curved lies at varying distances from the projector, the film should also be curved so that each portion of the film will lie in the correct optical plane in the projection window to correspond with the distance variation in the projection throw.

The crest or top of the arc described by the film will lie nearest the lens and when projected will occupy the central area of the screen. Since this portion of the screen is farthest from the projector, it is necessary to bring the lens and this section of the film frame closer together so that this portion of the screen image will be in sharp focus. This result is accomplished in the present invention by curving the film outward towards the screen so that the arc it describes is generally concentric with the curvature of the screen. Thus the portion of the film frame which should lie closest to the lens for sharp projection on the screen is in this position. Also, the areas of the film frame which should lie further away from the lens for sharp screen projection are so situated because of the arcuate position of the film at the projection area.

The device may be adjusted to vary the degree of arc described by the film as it passes through the projection area of the projector. This is accomplished by exerting more or less pressure upon the edges of the film. Greater pressure upon the film edges will cause the film to describe a more acute arc, while decreasing pressure will flatten the arc. The degree of arc imposed upon the film is varied until the correct arc for overall screen sharpness is found. No further adjustment of the arc should be necessary once the arc is properly adjusted.

In cases of old film prints whose width may vary from new stock, a slight adjustment of the device may be necessary. This adjustment can be done in the same manner as would be done in first determining the correct degree of arc for the film. To detect the necessity for this additional adjustment for film width variation, a width gauge should be used to check the film width before projection. In this manner the appropriate adjustments may be anticipated.

Methods of projection currently used have a depth of field or focus which resembles a shallow rectangular cube in appearance. Under ideal conditions the depth of this shallow cube will totally encompass the arcuate screen. As this zone of sharpness shifts forward or backward because of film variation, the edges of the screen will go in or out of focus. When this zone of sharpness shifts forward the extremities of the curved screen will be sharp but the central area of the screen will be out of focus. If the zone of sharpness shifts to the rear, then the screen's center will remain sharp while the edges of the screen will go out of focus.

By using the corrective device which is the subject of this invention, this will not occur. The zone of sharpness or depth of field here will be of an arcuate configuration, so that the zone of sharpness will curve with the arc of the screen. Being of an arcuate configuration, the zone of sharpness will always encompass the total screen area even though it may shift forward or backward. The advantage of this device becomes obvious when it is contrasted to the current method where a similar shift in zone sharpness will throw certain areas of the screen image out of focus and thereby detract from its entertainment value.

Other objects of the present invention will become apparent upon reading the following specification and referring to the accompanying drawings in which similar characters of reference represent corresponding parts in each of the several views.

In the drawings:

Fig. 2 is an enlarged perspective view of the film curving mechanism laid open;

Fig. 5 is a fragmentary enlarged sectional view of a portion of the device;

Fig. 6 is a side elevation of a modification and showing a sound track adjustment wedge;

Fig. 7 is a transverse section taken substantially along line 7—7 of Fig. 6.

Figure 1:
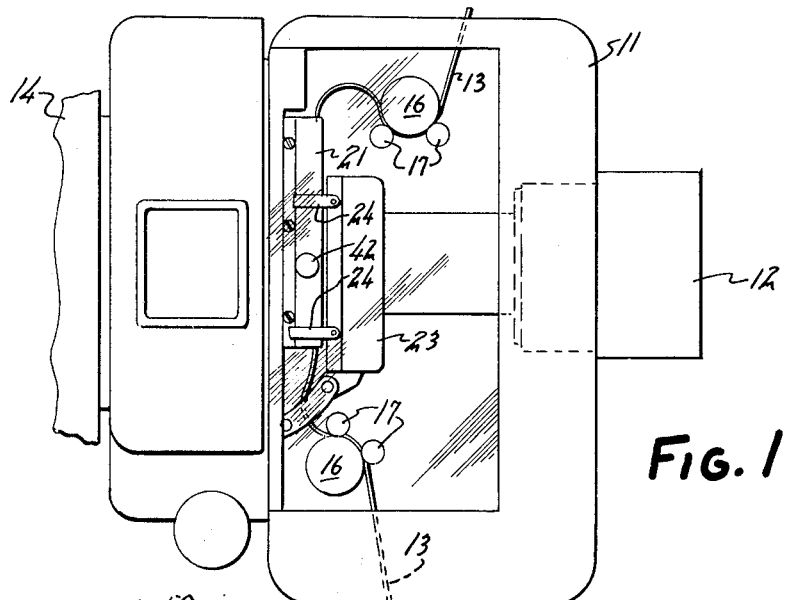
Fig. 1 is fragmentary side elevation of a portion of a projector employing the present invention.

The present invention is illustrated as installed in a motion picture projector. As shown in fragmentary fashion in Fig. 1, such a projector employs a casing 11 having at its forward end a lens held in a lens-holder 12. Film 13 which in the present instance is wider than conventional film, as compared with the height of each frame, enters through the top of casing 11 from a reel (not shown), passes through the mechanism hereinafter described, where it is illuminated from a light source 14 and thence is discharged through the bottom of casing 11. Sprockets 16 and pressure wheels 17 at top and bottom of casing 11 feed the film through the mechanism in conventional manner.

Mounted on the back of casing 11 is main plate 21 and hingedly connected thereto by means of hinge 22 is secondary plate 23. Hooks 24 hold the two plates 22 and 23 in proper relationship to each other but permit separation to the laid-open position shown in Fig. 2 when repair and adjustment must be performed. Main plate 21 is formed with an aperture 26 of the same dimension as a film frame and secondary plate 23 is formed with a similar aperture 27 so that light from the source of illumination 14 passes through aperture 26 thence through one frame of the film 13 and through aperture 27. To assist in the framing operation, a second framing aperture 28 is formed in main plate 21 a predetermined distance above aperture 24.

Film 13 passes down in the narrow space between the two plates 21 and 23. The characteristic of the present invention is the fact that pressure is applied to the film edges to cause the film to bow forwardly and assume an arcuate configuration in cross-section.

Plate 21 carries a pair of inwardly facing guide channels 31, one on either side of aperture 26. Above and below aperture 26 channels 31 are formed with grooves 33 in which are received inserts 37. Inserts 37 are provided with a series of roller bearings 38 which are concave in side elevation and receive the edge of the film at their deepest concavity. The upper end of channels 37 are flared outwardly to facilitate entry of film 13 therebetween. The spaces between the top and bottom of aperture 26 are provided with slide plates 39 between which the film edges pass.

In order to move channels 31 toward and away from each other, a threaded shaft 41 extends through plate 21 with a knob 42 exteriorly thereof. The threaded rod 41 is held in proper location by a central bearing 43 and by end bearings 44 at either end thereof. To one side of central bearing 43 the rod 41 is formed with lefthand threads 41a and the other side is formed with righthand threads 41b. Channels 31 carry nuts 46 which are threaded onto rod 41 and by reason of the left and right-hand threads on the rod, turning of knob 42 causes nuts 46 to move toward and away from each other. In order to hold the channels 31 in properly aligned parallel relationship tubes 47 are fixed to one of the channels and rods 48 telescopically received in the tubes to the other. Thin inwardly projecting plates 49 are fastened to the inner rearward edges of guide channels 31 and are cut away in half-windows 51 adjacent aperture 26.

Located on secondary plate 23 are a top and bottom pressure plate 56 and 57, respectively, to apply pressure against the film above and below the apertures 26 and 27. Pressure plates 56 and 57 are concave and their concavity is variable to conform to the arc imposed upon the film 13 as it passes through guide channels 31. Adjustment of the film arc 13 and the arc of the pressure plates 56 and 57 is synchronized and adjustment is made solely by turning knob 42. In order to accomplish this result, rod 41 carries a pinion 58 which meshes with the front rack 59 on vertically slidable bar 61. Bar 61 is formed with vertical slots 62 and held on main plate 21 by means of rivets 63 passing through slots 62. Hence as knob 42 is turned, bar 61 is raised or lowered. The opposite face of bar 61 is formed with an upper and a lower rack 64 and 66, respectively.

Secondary plate 23 carries upper and lower adjustment plates 67 and 68 which are biased rearwardly by means of helical springs 69 interposed between adjustment plates 67 and 68 and secondary plate 23. A threaded rod 71 etxends through each adjustment plate 67 and 68 and each rod 71 carries a pinion 72 on its outer end which meshes with racks 64 or 66 when plate 23 is in closed position. Accordingly rods 71 are turned in synchronism with rod 41. One half of each of rods 71 is cut with a lefthand thread 71L and the opposite half with a right-hand thread 71R. Central bearing 73 and end bearings 74 support rods 71 in position. Nuts 76 on vertical bars 77 cause the bars 77 to move inwardly and outwardly as knob 42 is turned. Rods 78 telescopically received in tubes 79 hold bars 77 in parallel vertical position in the same manner as members 47 and 48.

Pressure plates 56 and 57 are preferably formed with an offset central portion 78, so that only the edge portions 79 contact the film 13. Hence the emulsion in the center of the film 13 is not worn or scratched because the offset central portion 78 does not contact that area. A piano-type hinge 81 extends longitudinally along each vertical edge of pressure plates 56 and 57 and the plates are hinged thereby to members 82 secured to bars 77 which thus permits flexure of the pressure plates as the knob 42 is turned.

Figure 4:
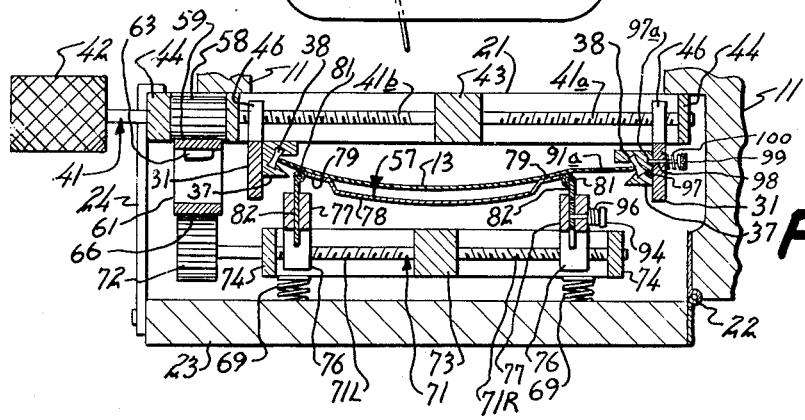
Fig. 4 is a view similar to Fig. 3 showing adjustment for film with a sound track.
Figure 3:
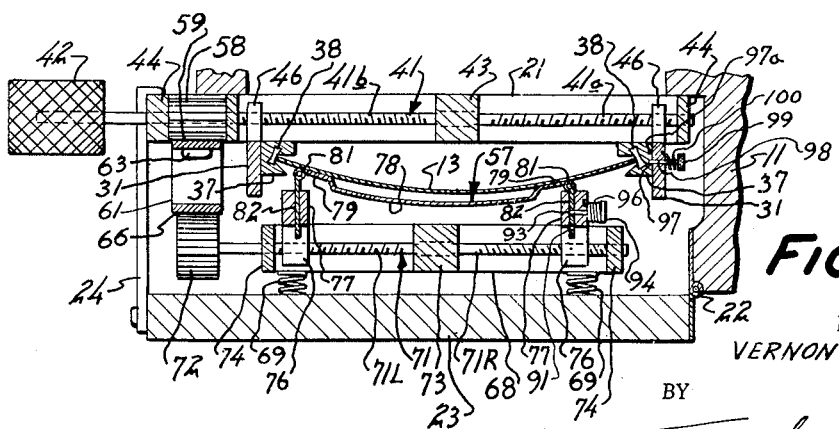
Fig. 3 is a transverse sectional view taken substantially along the line 3—3 of Fig. 2; showing the mechanism adjusted for film without a sound track.

In some instances film 13 is provided with a sound track 91a whereas in other instances such track is omitted. The center of the picture varies depending upon whether the track 91a is or is not present and accordingly the crest of the arc imparted to the film by the channels 31 must be shifted if the machine is to accommodate both types of film. The mechanism whereby the shift is accomplished is shown particularly by contrasting Figs. 3 and 4 and by examination of Fig. 5. One of the hinge members 82 is slidable in bar 77 and its inner end is provided with a pair of holes 91 and 92. A pin 93 is slidable in bar 77 in a direction transverse to the sliding movement of member 82. Pin has a head 94 and is biased inwardly by spring 96. When the pin 93 is pulled outwardlly by means of head 94 it clears the holes 91 and 92 and permits the member 82 to be moved out or in. The foregoing mechanism is shown particularly in Fig. 5. As shown in Fig. 3 the machine is adjusted for film without a sound track and in such instance the member 82 is retracted as far as possible within the bar 77. However as shown in Fig. 4 the member 82 is projected and the pin 93 fits in hole 91 instead of hole 92. This shifts the crest of the arc of the film to the left as compared with the position of the crest in Fig. 3 and is used for film having sound track 91a.

Similarly, the right-hand insert strip 37 is slidable relative to channel 31 in a direction toward and away from main plate 21. Strip 37 is formed with a pair of holes 97 and 97a and channel 31 with a locking pin 98 which can fit into either of holes 97 or 97a. Pin 98 has a head 99 and is biased inward by spring 100. When pin 98 is retracted by pulling head 99, it clears holes 97, 97a and permits strip 37 to be moved in or out in the same manner and same distance as member 82.

Accordingly, in operation, the attendant first locates the pin 93 in one of the holes 91 or 92 and pin 98 in one of holes 97 or 97a depending upon whether a sound track 91a exists on the film 13. Thereupon the film is threaded through the sprocket 16 and between the plates 21 and 23. Guides 31 receive the edges of the film. Thereupon the plates 21 and 23 are hooked together by means of hooks 24. The operator then adjusts the curvature of the film by turning adjustment knob 42. Turning of knob 42 causes channels 31 to move toward or away from each other and also causes the member 61 to be elevated or lowered which in turn causes movement of pinions 72 and results in bars 77 moving toward or away from each other which adjusts the curvature of the pressure plates 78. Accordingly the curvature may be adjusted so that the focus of the film is proper both at the edges as well as at the center of the arcuate projecting screen.

A modified or simplified construction is shown in Figs. 6 and 7. A single plate 21a is employed which carries rod 41 turned by knob 42 supported by central bearing 43 and end bearings 46. Rod 41 has a left hand thread 41L and a right hand thread 41R. A flexible plate 101 having an aperture 26 and having inwardly turned edges 102 is mounted on plate 21a and the edges of the flexible member 101 are engaged by inwardly and outwardly slidable members 103 which are in turn fastened to members 104 which are threaded and receive rod 41. Members 104 function as nuts so that as rod 41 is turned, members 103 are moved toward and away from each other and in turn flex the member 101 which causes the film to assume the proper curvature.

Adjustment may be made for film having sound tracks or not having sound tracks by inserting or removing a wedge 106 which is formed with an aperture 107. Inserting the wedge 106 causes the arc crest to shift toward the left in the same manner as described with reference to Figs. 3 and 4. The other elements of the mechanism, shown in Figs. 6 and 7 are similar in structure and function to the corresponding mechanism of Figs. 1 to 5, inclusive and hence are provided with similar reference numerals.

Although the foregoing invention has been described in some detail by way of illustration and example for purposes of clarity of understanding, it is understood that certain changes and modifications may be practiced within the spirit of the invention and scope of the appended claims.

What is claimed:
1. A device for curving a moving film about an axis parallel to the direction of movement comprising an apertured plate, a pair of side edge guides on opposite sides of the aperture in said plate and shaped to receive the edges of film, means mounting said side edge guides on said plate for movement toward and away from each other, means for moving said side edge guides toward and away from each other to vary curvature of film passing therebetween, the areas of contact of said side edge guides with the film being remote from the central portion of said film, and in which at least one of said means mounting said side edge guides includes means for holding said one side edge guide in at least two positions, one of said two positions being closer to said apertured plate than the other said position, whereby to shift the crest of film arc laterally to compensate for the presence or absence of sound track on the film.

2. A device for curving a moving film transversely to its direction of movement comprising a base plate, a secondary plate, means detachably mounting said plates for parallel, contiguous alignment, each of said plates being formed with juxtaposed frame apertures, film edge guides shaped to engage the side edges of film, means mounting said guides on said base plate for movement toward and away from each other to vary the arc of film, adjustment means on said base plate for moving said guides simultaneously, at least one curved flexible pressure plate on said secondary plate positioned to engage the edges of film to conform said film to an arc, holding means for opposite edges of said pressure plate, and means for moving said holding means toward and away from each other to vary the curvature of said pressure plate, and in which at least one of said holding means includes means for holding said one edge in at least two positions, one of said two positions being closer to said base plate than the other of said position.

3. A device according to claim 2 in which at least one of said means mounting said guides includes means for holding one of said guides in at least two positions, one of said two positions being closer to said base plate than the other said position.

References Cited in the file of this patent
UNITED STATES PATENTS

| | | |
|---|---|---|
| 1,437,895 | Horst | Dec. 5, 1922 |
| 1,489,988 | Dickinson | Apr. 8, 1924 |
| 1,911,320 | Le Barbier | May 30, 1933 |
| 2,007,018 | La Porte | July 2, 1935 |
| 2,081,299 | Hill | May 25, 1937 |
| 2,174,194 | Nemnich | Sept. 26, 1939 |

FOREIGN PATENTS

| | | |
|---|---|---|
| 228,671 | Switzerland | Dec. 1, 1942 |
| 202,315 | Australia | June 27, 1956 |